United States Patent
Takano et al.

(10) Patent No.: US 6,733,875 B1
(45) Date of Patent: May 11, 2004

(54) POROUS MEMBER AND METHOD OF MANUFACTURING THE SAME

(75) Inventors: Yukio Takano, Fukuoka-ken (JP); Ryuichi Kojo, Fukuoka-ken (JP); Takayuki Hirota, Fukuoka-ken (JP)

(73) Assignee: Toto, Ltd., Fukuoka-ken (JP)

( * ) Notice: Subject to any disclaimer, the term of this patent is extended or adjusted under 35 U.S.C. 154(b) by 1,768 days.

(21) Appl. No.: 08/336,402

(22) Filed: Nov. 9, 1994

(30) Foreign Application Priority Data

Nov. 26, 1993 (JP) .............................. 5-296227

(51) Int. Cl.⁷ ................................ B32B 3/26
(52) U.S. Cl. ................ 428/312.2; 428/312.6; 428/317.9; 428/315.5; 427/559; 427/373; 427/376.3
(58) Field of Search .................. 428/304.4, 306.6, 428/307.3, 307.7, 309.9, 310.5, 312.2, 312.6, 317.9, 315.5; 427/559, 373, 376.3

(56) References Cited

U.S. PATENT DOCUMENTS 4,429,003 A * 1/1984 Fredriksson et al. ..... 428/317.9
5,268,031 A * 12/1993 Lassiter et al.
5,296,288 A * 3/1994 Kourtides et al. .......... 428/262

FOREIGN PATENT DOCUMENTS

| AU | 275864 | * | 6/1964 | ............. | 428/317.9 |
| GB | 2071639 | * | 9/1981 | ............. | 428/307.7 |
| JP | 5356447 | | 5/1978 | | |
| JP | 59166699 | | 9/1984 | | |

* cited by examiner

Primary Examiner—Elizabeth M. Cole
(74) Attorney, Agent, or Firm—Carrier, Blackman & Associates, P.C.; Joseph P. Carrier; William D. Blackman

(57) ABSTRACT

A porous member for pneumatic bearings or the like provides a controlled gas flow rate across a porous ceramic body, which can be readily achieved by a facilitated treatment. The porous body has its outer surface portion covered by a surface layer comprised of fine silica particles which are impregnated in the porous body. The surface layer is subjected to a heat treatment to form restricted passages which are in communication with, and smaller in size than pores within the porous body.

12 Claims, 3 Drawing Sheets

POROUS MEMBER AND METHOD OF MANUFACTURING THE SAME

BACKGROUND OF THE INVENTION

1. Field of the Invention

The present invention relates to a porous member which may be used as a static pressure type pneumatic bearing, filter, humidity sensor or the like, and also pertains to a method of manufacturing such porous members.

2. Description of the Related Art

Heretofore, there has been used a static pressure type pneumatic bearing which is adapted to form a pneumatic film on its surface by ejecting gas therefrom, so as to guide a magnetic tape or the like moving object under an essentially contact-free condition, or to reduce the friction between the bearing and a rotational shaft journalled thereby.

It is a conventional practice to provide such a static pressure type pneumatic bearing with an orifice restriction, autogenous restriction, surface restriction, porous restriction or the like, for improving the load-bearing performance of the bearing. Among these restrictions, it has been confirmed that the porous restriction serves to effectively realize a bearing having a distinguished load-bearing performance and a high bearing stiffness. However, the operation or function of the porous restriction tends to become unstable due to a pneumatic hammer phenomena.

Thus, Japanese Laid-open Patent, Publication Nos. 53-56,447 and 59-166,699 each discloses a porous member having a porous restriction provided on its surface with further restrictions. Specifically, the technology disclosed in Japanese Laid-open Patent Publication No. 53-56,447 is to form a coated layer on the pore surface of the porous body by ion plating, ordinary plating, deposition, coating or the like. Further, the technology disclosed in Japanese Laid-open Patent Publication No. 59-166,699 is to form burrs on the bearing surface side of the porous body, and subsequently cause the burrs to undergo a partial decomposition by an electrolytic treatment so as to control the cross flow rate, or gas flow rate. However, these known measures suffer from various drawbacks is that they are applicable only to porous members of a relatively simple configuration, and it is still difficult to properly control the cross flow rate even in the case of porous members having a simple configuration, thereby necessitating a series of adjustments on a trial-and-error basis.

Moreover, the above-mentioned various treatments have to be performed with respect to the surface of the porous body during or after a precise machining. Consequently, there may be instances wherein a sufficient surface accuracy cannot be achieved without carrying out an additional surface finishing. Besides, the required treatments have to be performed with an elaborate facility or large scale equipment which is not only disadvantageous in terms of cost, but also in that it may give rise to such problems as pollution due to a waste treatment to be performed with respect to the plating liquid or electrolyte.

SUMMARY OF THE INVENTION

It is therefore a primary object of the present invention to provide an improved porous body which can be manufactured in such a manner which is capable of eliminating or mitigating the drawbacks of the conventional structures.

Another object of the present invention is to provide an improved method of manufacturing porous bodies, which is capable of eliminating or mitigating the drawbacks of the conventional structures.

According to one aspect of the present invention, there is provided a porous member comprising a porous body having an outer surface portion and a number of internal pores, said outer surface portion of the porous body being covered by a surface layer comprised of fine particles which are impregnated in the outer surface portion of the porous body and which have been subjected to such a heat treatment as to form restricted passages which are in communication with, and smaller in size than said pores.

With the above-mentioned features of the porous member according to the present invention, the restricted passages which are in communication with, and smaller in size than the pores in the porous body can be formed in a facilitated manner, by forming a surface layer comprised of fine particles which are impregnated in the outer surface portion of the porous body, and subjecting the fine particles to a heat treatment and causing adhesion of the fine particles with each other.

The porous body may comprise a ceramic body having a mean pore diameter which is on the order of 10 $\mu$m. The fine particles may comprise an inorganic oxide having a mean diameter which is on the order of 0.01–1 $\mu$m.

According to another aspect of the present invention, there is provided a method of manufacturing porous members, comprising the steps of: forming a surface layer on an outer surface portion of a porous body having internal pores, said surface layer being comprised of fine particles which are impregnated in the outer surface portion of the porous body; and heat-treating the surface layer and thereby forming restricted passages which are in communication with, and smaller in size than said pores.

Advantageously, the surface layer is formed by applying to the outer surface portion of the porous body a treating or mixture liquid containing said fine particles, and subsequently drying and solidifying the treating liquid.

In one preferred embodiment of the method according to the present invention, the treating liquid comprises a silica sol in which fine silica particles are dispersed, with the heat treatment performed at a temperature of approximately 400° C.

In this instance, the porous body of ceramics or the like impregnated by the dispersion liquid of the fine particles has its pores which are filled by the particles. By subsequently performing a heat treatment with respect to such a porous body, however, the dispersion liquid is dried up and caused to solidify thereby forming cracks as gas passages. The size of such cracks is predominantly dependent upon the concentration of the dispersion liquid, but not on the impregnating time.

Therefore, the fine particles of the surface layer are filled in the pores within the porous body and cracks are then formed in such surface layer as passages for conducting fluid therethrough. Thus, the method of the present invention is suitable for controlling the gas flow rate across the porous body having a relatively complex configuration. Since the size of the cracks influential on the gas flow rate is predominantly dependent upon the concentration of the dispersion liquid, the gas flow rate provided by the porous body can be controlled in a very facilitated manner and the desired flow rate can be achieved by a single treatment step. Moreover, the outer surface of the porous body does not require any plastic deformation, such as formation of burrs or the like. It is therefore possible to preserve the desired accuracy of the finished surface of the porous body as it is, without requiring any after-treatment or facilities therefor. Furthermore, the required steps are only to impregnate the porous body with the sol liquid and perform a heat treatment; thus, an elaborate facility is unnecessary and the porous body can be advantageously manufactured at a low cost, without giving rise to any environmental problems.

In another preferred embodiment of the method according to the present invention, the treating liquid is a mixture comprising a resin emulsion and the fine particles dispersed in the emulsion. The resin emulsion may contain a thickener. In this instance, when the porous body is impregnated by a treating liquid comprised of a resin emulsion and fine particles, and the impregnated mixture (or treating) liquid is then dried and solidified, the pores in the outer surface portion of the porous body are clogged with the fine particles. By subsequently performing a heat treatment, however, the fine particles are adhered to each other while the resin emulsion is decomposed and removed thereby forming restricted passages which are capable of conducting gas or absorbing liquid.

This embodiment, too, is suitable for controlling the gas flow rate and the like of the porous body having a relatively complex configuration. The size of the restricted passages is influential on the gas flow rate or liquid absorption amount, and is dependent predominantly on the proportion of the resin emulsion within the treating liquid, but essentially not on other factors, Therefore, the size of the restricted passages can be controlled in a facilitated manner, and the desired flow rate can be achieved by a single treatment step. Moreover, the surface layer of the fine particles formed by an adhesion induced by the heat treatment has an excellent mechanical strength. In this instance also, as mentioned hereinbefore, it is possible to preserve the desired accuracy of the finished surface of the porous body as it is, without requiring any after treatment or facilities therefor. The required steps are only to impregnate the porous body with a liquid mixture the treating liquid and perform a heat treatment; thus, an elaborate facility is unnecessary and the porous body can be advantageously manufactured at a low cost, without giving rise to any environmental problems.

Preferably, the porous body comprises alumina and the treating liquid is a mixture comprising a resin emulsion of a polyvinyl acetate group and fine silica particles dispersed in the emulsion. In this instance, preferably, the heat-treatment of the surface layer is performed at a temperature which is not higher than approximately 700° C.

In this instance, the treating liquid may be a mixture comprising a resin emulsion, first fine particles having a relatively low melting temperature, and second fine particles having a relatively high melting temperature, said first and second fine particles being dispersed in the emulsion. Then, the heat treatment of the surface layer may be performed at a temperature which is higher than the melting temperature of the first fine particles so that the second fine particles are connected with each other by the first fine particles.

When the porous body comprises alumina and the treating liquid is a mixture of an emulsion of a polyvinyl acetate group resin containing a thickener and fine particles of silica having different mean diameters and dispersed in the emulsion, the heat treatment can be performed at a temperature of approximately 400° C.

BRIEF DESCRIPTION OF THE DRAWINGS

The present invention will now be explained in further details hereinafter, by referring to some preferred embodiments shown in the accompanying drawings, in which.

DETAILED DESCRIPTION OF THE PREFERRED EMBODIMENTS

Figure 1:
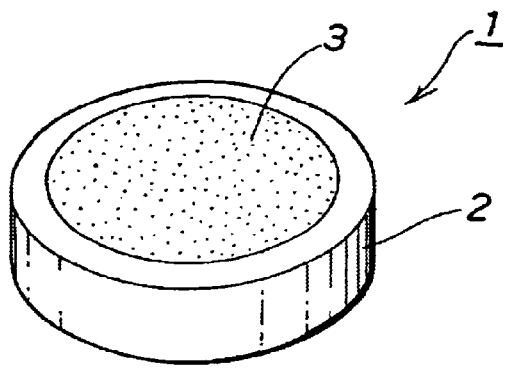
FIG. 1 is a perspective view showing the porous body before it is formed with a fine particle surface layer.

Referring now to FIG. 1, there is shown a thrust bearing as one practical embodiment of the porous body according to a first embodiment of the present invention. It will be readily appreciated from the following detailed description that the present Invention can be applied not only to such a thrust bearing, but also to various types of porous bodies, such as radial bearing., guide members for magnetic tapes, filters, casting molds for ceramic articles, etc., as well as to the production of these porous bodies.

As shown in FIG. 1, which is a perspective view of a thrust bearing prior to formation of a fine particle surface layer, the thrust bearing 1 as a whole is substantially disc-shaped and includes a dish-like casing 2 having an annular peripheral wall, and a disc 3 comprising a maid ceramic porous body which is fitted into, and integrally secured to the casing 2. As particularly shown in FIGS. 2 and 3, which are respectively a longitudinal-sectional view and a plan view, both in enlarged scale, the disc 3 has a number of pores 4 with a mean diameter on the order of 10 $\mu$m.

Figure 4:
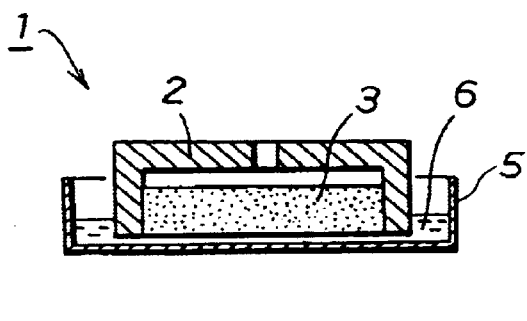
FIG. 4 is a schematic longitudinal-sectional view showing one example of means for impregnating the porous body with a liquid mixture

After the disc 3 has been fitted into and integrally secured to the casing 2, the thrust bearing 1 is immersed into a treating liquid in the form of a dispersion liquid or sol 6 within a vessel 5, as shown in FIG. 4. Thus the outer surface side of the disc 3 is dipped in the sol under ambient pressure and the outer surface portion of the disc 3 is impregnated with the sol 6. The sol 6 used in this instance is a dispersion liquid of fine particles, which has been prepared to have a predetermined concentration. The fine particles may comprise an inorganic oxide, such as silica ($SiO_2$) or alumina ($Al_2O_3$) having a mean particle diameter of 0.01–1 $\mu$m, or an appropriate organic substance. Furthermore, the impregnating time in which the disc 3 is subjected to the impregnation may be approximately 1–3 minutes.

Figure 5:
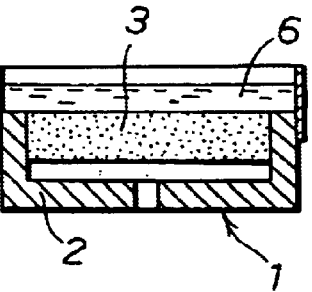
FIG. 5 is a schematic longitudinal-sectional view showing another example of means for impregnating the porous body with a liquid mixture.

The manner of impregnating the outer surface portion of the disc 3 with the sol 6 is not limited to that shown in FIG. 4. For example, as shown in FIG. 5, it is also possible to arrange the disc 3 with its outer surface side oriented upwardly and to surround and tightly wrap the casing 2 in its upper region of the outer periphery by means of an annular band 7, thereby to form a vessel on the outer surface side of the disc 3. In this instance, the outer surface portion of the disc 3 is impregnated with the sol 6 from under ambient pressure. Alternatively, the thrust bearing 1 as a whole may be completely dipped into the sol. Any method may be used in this connection, provided that the outer surface portion of the porous body can be sufficiently impregnated by the sol 6.

Figure 6:
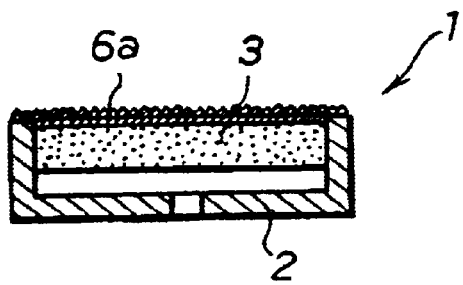
FIG. 6 is a longitudinal-sectional view showing the porous body formed with a fine particle surface layer after it is been impregnated by the liquid mixture.
Figure 7:
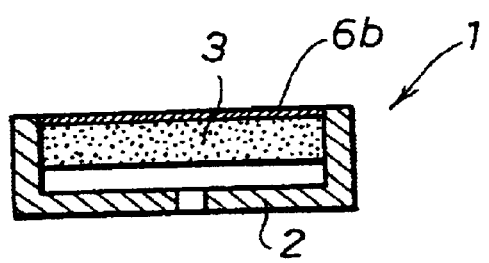
FIG. 7 is a longitudinal-sectional view showing the porous body from which excessive fine particle layer liquid on its surface is removed.

After the outer surface portion of the disc 3 has been impregnated with the sol 6, according to the example shown in FIG. 4, the disc 3 is removed from the vessel 5. As shown in FIG. 6, when the disc 3 has been removed from the vessel 5, a excessive sol 6a remains in adhesion with the outer surface of the disc 3. Thus, such excessive sol 6a is wiped and removed away from the outer surface of the disc 3, by means of a sponge or the like. The disc 3 with the excessive sol 6a removed from its outer surface is shown in FIG. 7. At this point in time, the sol comprised of the fine particles impregnated as above remains as a residual sol 6b inside the outer surface portion of the disc 3.

Figure 8:
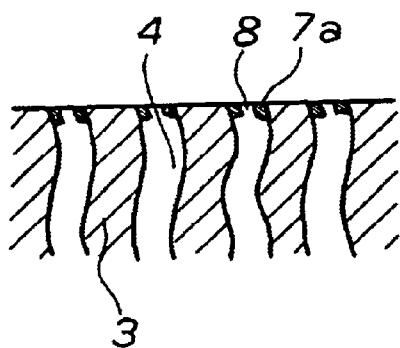
FIG. 8 is a longitudinal-sectional view showing in enlarged scale the porous body in which fine particles are adhered to the pores in the porous body.
Figure 9:
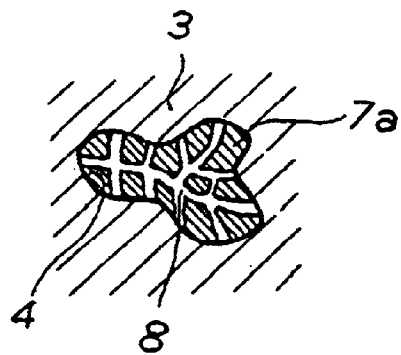
FIG. 9 is a plan view showing in enlarged scale the pores restricted by cracks which are formed in the fine particle surface layer.

Subsequently, the thrust bearing 1 which comprises the disc 3 having its outer surface portion impregnated with the sol 6b of the fine particles is subjected to a heat treatment. This heat treatment is performed at a temperature within a range from room temperature to approximately 700° C. By this heat treatment, a fine particle layer 7a on the outer surface portion of the disc 3 covering the pores 4 of the disc 3 is formed with a number of slits 8, as particularly shown in FIGS. 8 and 9, which are longitudinal-sectional view and plan view, respectively, of the outer surface portion of the disc 3. These slits 8 are sufficiently small in size, as compared to the pores 4, and thus serve as restricted passages to provide a desired, substantially constant gas flow rate of the thrust bearing 1.

Actual experiments performed with the porous body according to the above-mentioned embodiment will be explained below, with reference to various samples of the thrust bearings which were prepared under the following conditions.

EXAMPLE 1 base material: porous body of alumina with mean pore diameter of 10 $\mu$m
fine particles: silica (mean diameter: 10–20 nm or 260 nm)
sol concentration: 3–30 wt %
impregnating time: 1–3 minutes
heat treatment: 400° C. for 30 minutes For these sample thrust bearings, the respective gas flow rate were measured and the restriction ratios were calculated based on the measured gas flow rate. The term "restriction ratio" is defined by a normalized value which represents the gas flow rate of the porous body after it has been impregnated with the fine particles, as divided by the gas flow rate of the same porous body in its pre-impregnated state. The restriction ratios of the sample thrust bearings calculated as above are shown in the following Tables 1 and 2.

TABLE 1

(SiO$_2$ particle diameter: 10–20 nm)

| SiO$_2$ concentration (wt %) | impregnating time (min.) | | |
|---|---|---|---|
| | 1 | 2 | 3 |
| 3.00 | 15.67 | 20.88 | 13.26 |
| 3.75 | 20.55 | 21.00 | 15.04 |
| 7.50 | 43.90 | 50.11 | 48.87 |
| 15.00 | 75.50 | 75.81 | 72.56 |
| 30.00 | 76.92 | 86.65 | 86.57 |

TABLE 2

(SiO$_2$ particle diameter: 260 nm)

| SiO$_2$ concentration (wt %) | impregnating time (min.) | | |
|---|---|---|---|
| | 1 | 2 | 3 |
| 3.00 | 15.24 | 14.82 | 14.62 |
| 3.75 | 15.71 | 22.58 | 14.25 |
| 7.50 | 44.95 | 55.20 | 52.84 |
| 15.00 | 85.98 | 78.74 | 77.48 |
| 30.00 | 99.02 | 98.59 | 98.47 |

It can be appreciated from the Tables 1 and 2 above that the restriction ratio of the porous body is predominantly dependent upon the sol concentration, but not upon other factors such as the fine particle diameter or impregnating time.

Durability tests were further performed using these sample thrust bearings, which included passage of compressed air at a pressure of 10 kgf/cm$^2$ through the samples, subjecting the samples to a repeated heat cycle of 0–100° C., and subjecting the samples to repeated water immersion and drying. It has been confirmed by such durability tests that the fine silica particles remain firmly attached to the alumina base body without causing undesirable separation therefrom, and hence the gas flow rate of the thrust bearing can be maintained substantially unchanged.

While the present embodiment has been explained above with reference to one embodiment of a porous body for a thrust bearing, it can be applied also to other types of porous bodies, such as radial bearings guide member for magnetic tapes, filters, casting molds for ceramic articles, etc.

In accordance with the above-mentioned embodiment of the present invention, a ceramic or the like porous body is impregnated with a dispersion liquid of fine particles, such as silica sol or the like, and subjected to a heat-treatment to dry and solidify the impregnated dispersion liquid in the porous body so that the pores in the porous body are filled by the fine particles and restricted passages for conducting gas are formed as cracks in a surface layer consisting essentially of the fine particles and covering the outer surface portion of the porous body. This method is very suitable for controlling the gas flow rate of the porous body having a relatively complex configuration.

Since the size of the cracks is predominantly dependent upon the concentration of the sol, but essentially not on other factors, the gas flow rate provided by the porous body can be controlled in a very facilitated manner and the desired flow rate can be achieved by a single treatment step.

The outer surface of the porous body does not require any plastic deformation, such as formation of burrs or the like, and it is thus possible to preserve the desired accuracy of the finished surface of the porous body as is, without requiring any after-treatment or facilities therefor. The required steps are only to impregnate the porous body with the sol liquid and perform a heat treatment. Thus, the desired porous bodies can be advantageously manufactured at a low cost, without using an elaborate facility and giving rise to any environmental problems.

The above-mentioned embodiment of the present invention proved to advantageously overcome the drawbacks of the prior art. However, as a result of thorough experiments and investigations conducted by the inventors, it has been found that a further improvement can be achieved in respect of strength of the fine particle surface layer, accuracy of controlling the total surface area of the restricted passages in the porous body, and the like. Such improved method will be more fully explained below.

Figure 2:
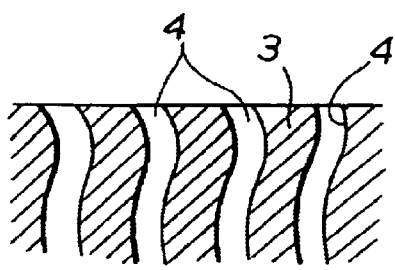
FIG. 2 is a longitudinal-sectional view showing part of the porous body in enlarged scale.
Figure 3:
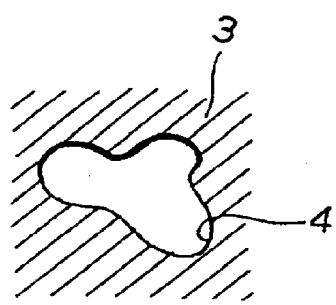
FIG. 3 is a plan view showing the pores within the porous body in enlarged scale.

According to a second embodiment of the present invention, the thrust bearing 1 is essentially same as that shown in FIG. 1, and includes a dish-like air suction casing 2, and a disc 3 which is fitted into and integrally secured to the casing 2. The disc 3 according to the present embodiment also comprises a ceramic porous body 3 as shown in FIGS. 2 and 3. Thus, the disc 3 has a number of pores 4 with a mean diameter which is on the order of 10 $\mu$m.

The thrust bearing 1 on its outer surface side is immersed into a treating liquid 6 within a vessel 5 shown in FIG. 4 or within a vessel 7 shown in FIG. 5, so that the outer surface portion of the thrust bearing 1 is impregnated with the treating liquid 6. The treating liquid 6 in this embodiment is a mixture comprising a sol of fine particles, an emulsion and an appropriate thickener. As in the previous embodiment, the fine particles may comprise an inorganic oxide, such as silica ($SiO_2$) or alumina ($Al_2O_3$) having a mean particle diameter of 0.01–1 $\mu$m, or an appropriate organic substance. Furthermore, the impregnating time in which the porous body 3 is subjected to the impregnation may not be longer than 10 minutes.

By immersing the porous body 3 into the treating liquid 6, the outer surface portion of the porous body 3 is impregnated by the treating liquid 6 as shown in FIG. 6. Thereafter, the porous body 3 is removed from the vessel 5 and excessive treating liquid 6a is wiped and removed away from the outer surface of the porous body 3, by means of a sponge or the like. The porous body 3 with the excessive treating liquid 6a removed from its outer surface is shown in FIG. 7. At this point in time, the treating liquid comprised of the fine particles, which have been impregnated as above, remains as a residual liquid layer 6b on the outer surface portion of the porous body 3.

Subsequently, the porous body 3 having a residual liquid layer 6b on its outer surface is heated to a temperature of approximately 100° C. to dry and solidify the layer 6b.

Figure 10:
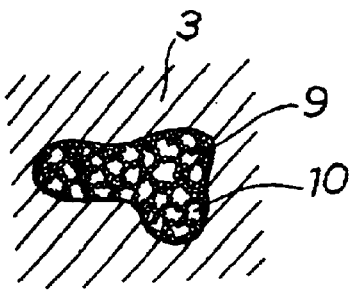
FIG. 10 is a plan view showing in enlarged scale the pores restricted by the fine particles which are adhered to the pore.

After such an initial heating, the porous body 3 is subjected to a heat treatment at a temperature which is not higher than approximately 700° C. The porous body 3 after this heat treatment has a longitudinal-section which is essentially the same as that shown in FIG. 8, and a plan view which is shown in FIG. 10. More particularly, as can be appreciated from FIG. 10, the heat treatment causes the fine particles in the emulsion to melt and adhere to each other, thereby closing the pores 4 within the porous body 3 by a fine particle layer 9. Furthermore, during the heat treatment, the resin emulsion is decomposed, gasified and thereby removed so as to form restricted passages 10. These restricted passages 10 are capable of absorbing liquid or passing gas therethrough and are in communication with the pores 4 within the porous body 3.

Actual experiments performed with the porous body according to the above-mentioned embodiment will be explained below with reference to various samples of the thrust bearings which were prepared under the following conditions.

EXAMPLE 2 base material: porous body of alumina with mean pore diameter of 10 $\mu$m fine particles: silica (mean diameter: 260 nm)

emusion: polyvinyl acetate resin group (mean diameter 6 $\mu$m)

impregnating time: 2–8 minutes heat treatment: 100° C. for 1 hour for drying, and 700° C. for 1 hour for adhesion

Figure 11:
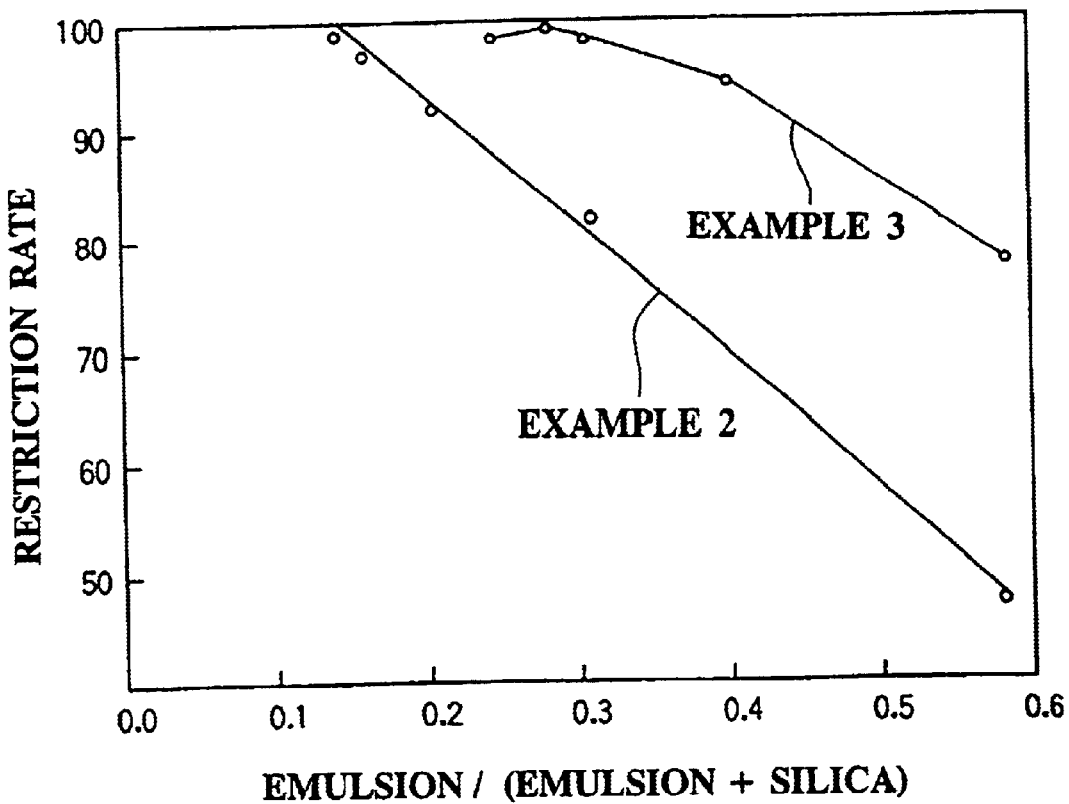
FIG. 11 is a graph showing the relationship between the proportion of the resin emulsion and the restriction rate.

EXAMPLE 3 base material: porous body of alumina with mean pore diameter of 10 $\mu$m fine particles: silica A (mean diameter: 10–20 nm, melting temperature: 400° C.)
silica B (mean diameter: 260 nm, melting temperature: 700° C.)
silica A: silica B=1:6 emulsion: polyvinyl acetate resin group (mean diameter 6 $\mu$m)

thickener: CMC (carboxylmethylcellulose) silica B: 5% CMC solution=5:1 impregnating time: 2–8 minutes heat treatment: 100° C. for 1 hour for drying, and 400° C. for 1 hour for adhesion For these sample thrust bearings, the respective gas flow rate were measured and the restriction ratios as defined above were calculated based on the measured gas flow rate. The relationship between the emulsion ratio (i.e., the ratio between the amount of emulsion and the total amount of the treating liquid comprising emulsion and silica fine particles) and the restriction ratio of Example 2 is shown in the following Table 3, and the relationship between the impregnating time and the restriction ratio of Example 2 is shown in the following Table 4. Further, the relationship between the emulsion ratio and the restriction ratio of Example 3 is shown in the following Table 5, and the relationship between the impregnating time and the restriction ratio of Example 3 is shown in the following Table 6. Moreover, FIG. 11 shows the relationship between the emulsion ratio and the restriction ratio in Examples 2 and 3.

TABLE 3

| Emulsion ratio | Restriction ratio (%) |
| --- | --- |
| 0.13 | 98.7 |
| 0.16 | 95.9 |
| 0.21 | 91.4 |
| 0.31 | 81.5 |
| 0.58 | 47.2 |

TABLE 4

| Impregnating time (min.) | Restriction ratio (%) |
| --- | --- |
| 2 | 98.1 |
| 3 | 98.5 |
| 4 | 98.3 |

Note: Emulsion ratio = 0.16

TABLE 5

| Emulsion ratio | Restriction ratio (%) |
|---|---|
| 0.25 | 98.2 |
| 0.28 | 99.0 |
| 0.31 | 98.3 |
| 0.40 | 94.4 |
| 0.58 | 78.6 |

TABLE 6

| Impregnating time (min.) | Restriction ratio (%) |
|---|---|
| 2 | 97.3 |
| 3 | 98.4 |
| 4 | 98.4 |

Note: Emulsion ratio = 0.31

It will be appreciated from Tables 3 and 5 and FIG. 11 that the restriction ratio of the porous: body varies proportionally to the amount of emulsion. It will be further appreciated from Tables 4 and 6 that the restriction ratio is kept substantially constant regardless of variable impregnating time, i.e., the restriction is not dependent upon the impregnating time.

Durability tests were further performed using these sample 1<thrust bearings, which included passage of compressed air at a pressure of 10 kgf/cm² through the samples, subjecting the samples to a repeated heat cycle of 0–100° C., and subjecting the samples to repeated water immersion and drying. It has been confirmed by such durability tests, that, in the porous bodies manufactured in accordance with Examples 2 and 3 also, the fine silica particles remain firmly attached to the alumina base body without causing undesirable separation therefrom, and hence the gas flow rate of the thrust bearing can be maintained substantially unchanged.

Furthermore, it has been confirmed by Example 3 that, when fine particles having a relatively high melting temperature are used, these fine particles can be effectively connected to each other by adding fine particles having a relatively low melting temperature, and performing the heat treatment at a temperature which is higher than the melting temperature of the added fine particles.

While the present embodiment has been explained above with reference to the second embodiment of a porous body for a thrust bearing, in this instance also, it can be applied to other types of porous bodies, such as radial bearings, guide members, for magnetic tapes, filters, casting molds for ceramic articles, etc.

With the above-mentioned second embodiment of the present invention, the porous body is impregnated by a treating liquid comprised of a resin emulsion and fine particles, and the impregnated treating liquid is then dried and solidified, so that the pores in the outer surface portion of the porous body are closed by the fine particles. By subsequently performing a heat treatment, the fine particles are adhered to each other while the resin emulsion is decomposed and removed there by forming restricted passages which are capable of conducting gas or absorbing liquid.

Thus, there is provided an improved method which is suitable for controlling the gas flow rate and the like of the porous body having a relatively complex configuration. The size of the restricted passages is influential on the gas flow rate or liquid absorption amount, and is dependent predominantly upon the proportion of the resin emulsion within the treating liquid, but essentially not on other factors, Therefore, the size of the restricted passages can be controlled in a facilitated manner, and the desired flow rate can be achieved by a single treatment step. Moreover, the surface layer of the fine particles formed by an adhesion induced by the heat treatment has an excellent mechanical strength.

In this instance also, as mentioned hereinbefore, it is possible to preserve the desired accuracy of the finished surface of the porous body as is, without requiring any after-treatment or facilities therefor. The required steps are only to impregnate the porous body with mixture liquid and perform a heat treatment; thus, an elaborate facility is unnecessary and the porous body can be advantageously manufactured at a low cost, without giving rise to any environmental problems.

Furthermore, when fine particles having a relatively high melting temperature are mixed with additional fine particles having a relatively low melting temperature, the heat treatment can be performed at a temperature which is lower than the melting temperature of the fine particles of a higher melting temperature to effectively connect the latter fine particles with each other, making it possible to minimize the required heat energy.

While the present invention has been described with reference to some preferred embodiments, they were given by way of examples only. Various changes and modifications may be made without departing from the scope of the present invention as defined by the appended claims.

We claim:

1. A porous member comprising a porous body having an outer surface portion and a number of internal pores, said outer surface portion of the porous body being covered by a surface layer comprised of fine particles which are impregnated in the outer surface portion of the porous body and which have been subjected to a heat treatment to form restricted passages which are in communication with, and smaller in size than said pores, said pores having a mean diameter which is on the order of 10 $\mu$m.

2. A method of manufacturing, porous members comprising the steps of:

forming a surface layer on an outer surface portion of a porous body having internal pores, said surface layer being comprised of fine particles which are impregnated in the outer surface portion or the porous body; and heat treating the surface layer and thereby forming restricted passages which are in communication with, and smaller in size than said pores;

said surface layer being formed by applying to the outer surface portion of the porous body a treating liquid containing said fine particle, and subsequently drying and solidifying the treating liquid.

3. The method according to claim 2, wherein said treating liquid comprises a silica sol in which fine silica particles are dispersed.

4. A method of manufacturing porous members, comprising the steps of:

forming a surface layer on an outer surface portion of a porous body having internal pores, said surface layer being comprised of fine particles which are impregnated in the outer surface portion of the porous body; and heat treating the surface layer and thereby forming restricted passages which are in communication with, and smaller in size than said pores;

said heat treatment is performed at a temperature of approximately 400° C.

5. The method according to claim 2, wherein said treating liquid is a mixture comprising a resin emulsion and said fine particles are dispersed in the emulsion.

6. The method according to claim 5, said resin emulsion contains a thickener.

7. The method according to claim 2, wherein said porous body comprises alumina and said treating liquid is a mixture comprising a resin emulsion of a polyvinyl acetate group and fine silica particles dispersed in the emulsion.

8. The method according to claim 2, wherein said treating liquid is a mixture comprising a resin emulsion, first fine particles having a relatively low melting temperature, and second fine particles having a relatively high melting temperature, said first and second fine particles being dispersed in the emulsion.

9. The method according to claim 8, wherein said heat treatment of the surface layer is performed at a temperature which is higher than the melting temperature of the first fine particles so that the second fine particles are connected with each other by the first fine particles.

10. The method according to claim 2, wherein said porous body comprises alumina and said treating liquid is a mixture of an emulsion of a polyvinyl acetate group resin containing a thickener, and fine particles of silica having different mean diameters and dispersed in the emulsion.

11. The method according to claim 10, wherein said beat treatment is performed at a temperature of approximately 400° C.

12. The method according to claim 2, wherein the treating liquid is initially dried at a temperature of 100° C., and subsequently heat treated to solidify the dried treating liquid.

* * * * *

UNITED STATES PATENT AND TRADEMARK OFFICE
CERTIFICATE OF CORRECTION

PATENT NO.    : 6,733,875 B1
DATED         : May 11, 2004
INVENTOR(S)   : Yukio Takano, Ryuichi Kojo and Takayuki Hirota It is certified that error appears in the above-identified patent and that said Letters Patent is hereby corrected as shown below:

Column 1,
Line 30, change "Patent, Publication Nos." to -- Patent Publication Nos. --

Column 3,
Line 35, change "any after treatment" to -- any after-treatment --.
Line 37, change "the treating liquid" to -- , the treating liquid, --.

Column 4,
Line 4, change "in enlarged scale:" to -- in enlarged scale; --.
Line 9, change "liquid mixture" to -- liquid mixture; --.
Line 16, change "it is been" to -- it has been --.
Line 39, change "the present Invention" to -- the present invention --.
Line 41, change "such as radial bearing.," to -- such as radial bearings, --.
Line 48, change "comprising a maid" to -- comprising a rigid --.

Column 5,
Line 9, change "from under ambient" to -- from above, again under ambient --.
Line 20, change "a excessive sol" to -- excessive sol --
Line 60, change "rate were measured" to -- rates were measured --.

Column 6,
Line 45, change "radial bearings guide member" to -- radial bearings, guide members --.

Column 7,
Line 16, change "is essentially same" to -- is essentially the same --.
Line 27, change "an emulsion and" to -- an emulsion, and --.

Column 8,
Line 34, change "rate were measured" to -- rates were measured --.

Column 9,
Line 21, change "ratio of the porous: body" to -- ratio of the porous body --.
Line 27, change "sample 1 < thrust bearings," to -- sample thrust bearings, --.
Line 31, change "durability test, that," to -- durability tests that, --.
Line 48, change "members, for magnetic" to -- members for magnetic --.
Line 58, change "removed there by forming" to -- removed thereby forming --.
Line 67, change "not on other factors," to -- not on other factors. --.

UNITED STATES PATENT AND TRADEMARK OFFICE
CERTIFICATE OF CORRECTION

PATENT NO.    : 6,733,875 B1
DATED         : May 11, 2004
INVENTOR(S)   : Yukio Takano, Ryuichi Kojo and Takayuki Hirota It is certified that error appears in the above-identified patent and that said Letters Patent is hereby corrected as shown below:

Column 10,
Line 39, change "manufacturing, porous members" to -- manufacturing porous members, --.
Line 44, change "portion or the" to -- portion of the --.
Line 51, change "containing said fine particle," to -- containing said fine particles, --.
Line 54, change "finc silica particles" to -- fine silica particles --.

Column 11,
Line 4, change "claim 5, said" to -- claim 5, wherein said --.

Column 12,
Line 10, change "wherein said beat" to -- wherein said heat --.
Line 14, change "temperature of 100º C.," to -- temperature of approximately 100º C., --.

Signed and Sealed this

Twenty-eighth Day of December, 2004

JON W. DUDAS
*Director of the United States Patent and Trademark Office*